Figure 1:
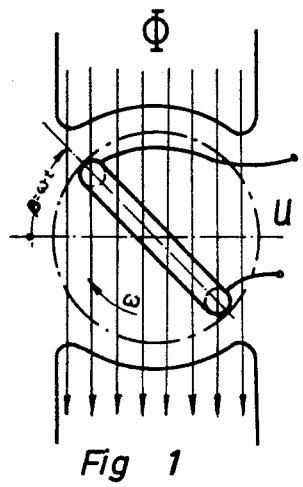

Dec. 4, 1962 H. BEUSSE ETAL 3,067,381
ELECTRIC GENERATOR SYSTEM WITH CONSTANT FREQUENCY
Filed June 10, 1960 2 Sheets-Sheet 1

INVENTORS:
HANS BEUSSE,
GEORG SCHUKAT
BY
Mestern & Rollin
ATTORNEYS

United States Patent Office 3,067,381
Patented Dec. 4, 1962

3,067,381
ELECTRIC GENERATOR SYSTEM WITH
CONSTANT FREQUENCY
Hans Beusse and Georg Schukat, Hamburg, Germany, assignors to Hamburger Flugzeugbau G.m.b.H., Hamburg-Finkenwerder, Germany.
Filed June 10, 1960, Ser. No. 36,110
Claims priority, application Germany June 12, 1959
7 Claims. (Cl. 322—90)

The invention relates to an electric generator system for producing a constant output frequency, under a variable drive speed imposed by a power transmission coupled to the system.

In German Patent No. 893,073, such a system has been described wherein an auxiliary machine serving as timer for the required constant output frequency feeds the stator of an induction machine whose rotor is rigidly connected with the rotor of another induction machine and is driven by a variable-speed source of power, while the rotor winding of the second machine is connected in inverted phase sequence to the rotor winding of the first machine, and the generator output is taken off the stator winding of the second machine, connected to a feedback winding in the stator of the first machine. By means of this known system, potentials are to be induced in the stator winding of the second machine, of frequency equal to the sum of timer frequency and rotational frequency, minus the rotational frequency; or in other words, equal to the timer frequency. The proposition that these effects, on which the invention is based, will likewise occur in a single-phase system, is merely asserted in the patent, not supported by any physical or mathematical demonstration. Besides, the usefulness of that device would tend to be severely limited by the adverse operating properties of asynchronous generators at speeds comparatively far above the synchronous speed.

The present invention takes a different approach to the solution of the stated problem, using a generator system comprising a principal machine producing the output frequency and consisting of two parts each having a field winding and a rotor winding, wherein the alternating current feeding the field winding of the second part exhibits a phase advance of $\pi/2$ over the alternating current potential feeding the field winding of the first part, and the rotor windings intersecting the alternating current fields of the field windings are displaced relative to each other spatially and by ninety degrees.

In further elaboration of the invention, the same effect is achieved by having the field windings rotate with their alternating current fields and arranging the rotor windings on the stator, the desired output potential at constant frequency being taken off the series-circuited rotor windings.

The device according to the invention will now be more fully described with reference to the accompanying drawings in terms of a single-phase alternating current system, but it will be understood that it may equally be applied to multi-phase systems, that these drawings are given by way of illustration and not of limitation, and that many changes in the details may be made without departing from the spirit of the invention.

Figure 2:
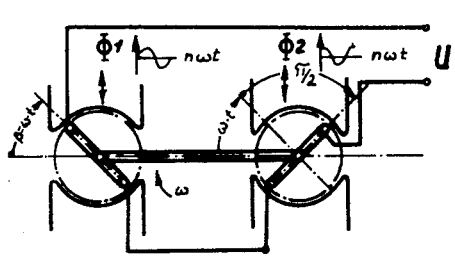
Figure 3:
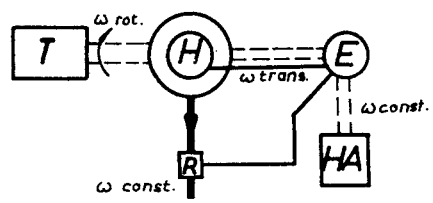
Figure 4:
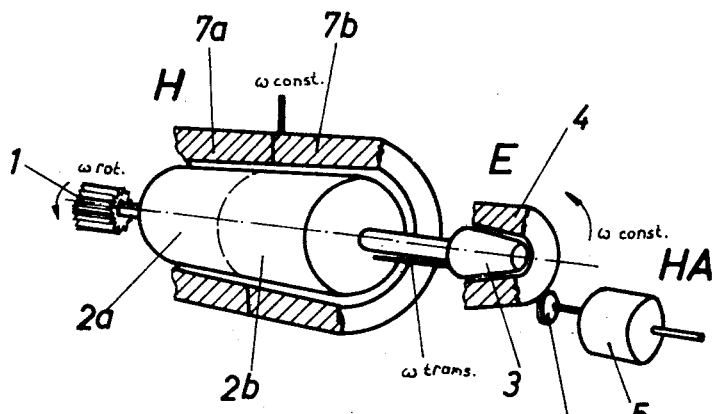
Figure 5:
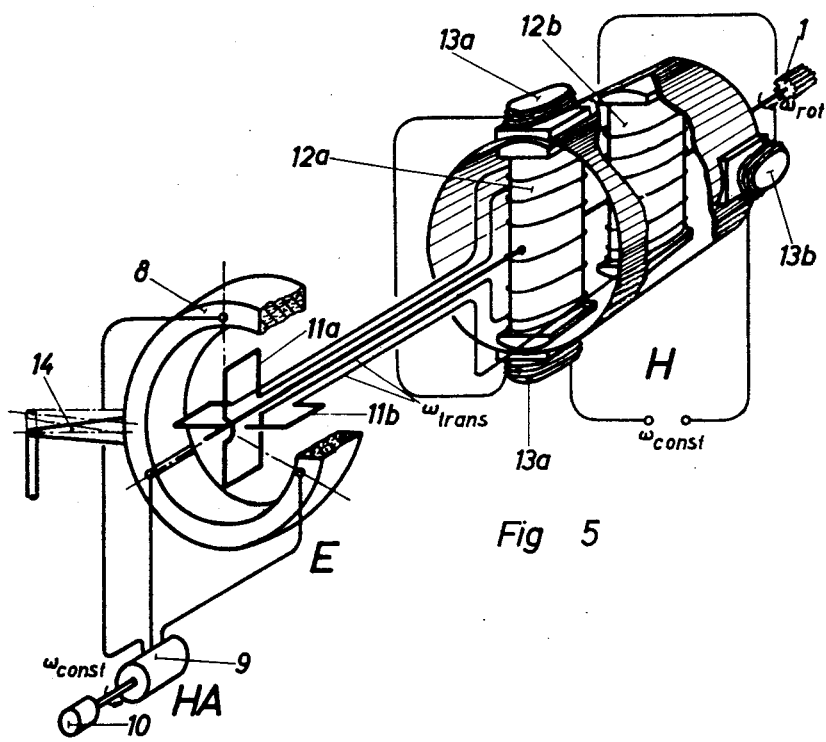
Figure 6:
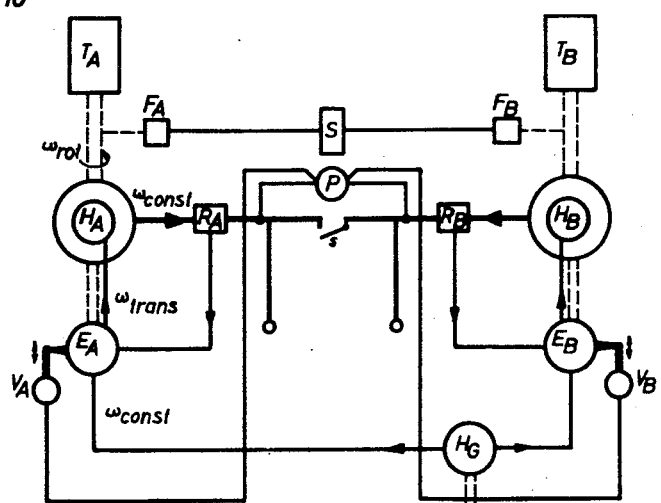

In the drawings,

FIG. 1, by way of preliminary demonstration, shows the rotation of a winding in a homogeneous magnetic field at constant angular velocity;

FIG. 2 schematically shows an embodiment of the system according to the invention;

FIG. 3 shows a block diagram of another embodiment;

FIGS. 4 and 5 pictorially illustrate two simplified embodiments of a generator system according to the invention;

FIG. 6 shows a diagram of two generator systems hooked up together.

Referring now to FIG. 1, the no-load potential of a conventional synchronous generator is given by:

$$U = Cd\phi (\cos \omega)/dt = -C\phi\omega \sin \omega t \qquad (1)$$

Rather than with direct current, the field windings are to be fed an alternating current whose frequency has a phase angle $\xi$ relative to the circular frequency $\omega$. The field $\phi$ excited by the alternating current is to have a circulary frequency $n\omega$. The magnetic field accordingly becomes $\phi = \hat{\phi} (\cos (n\omega t + \xi))$, and the generated potential:

$$U = Cd\phi (\cos (n\omega t + \xi))(\cos \omega t)/dt \qquad (2)$$

To solve this equation, let $n\omega t + \xi = \alpha$, $\omega t = \beta$. Then introducing $(\gamma + \rho)/2$ for $\alpha$ and $(\gamma - \rho)/2$ for $\beta$, this known relation holds:

$$\cos \left(\frac{\gamma + \rho}{2}\right) \cos \left(\frac{\gamma - \rho}{2}\right) = \frac{1}{2} (\cos \gamma + \cos \rho)$$

From the equations $\alpha = (\gamma + \rho)/2$ and $\beta = (\gamma - \rho)/2$, it follows that:

$$\gamma = \alpha + \beta \text{ and } \rho = \alpha - \beta$$

So we can write:

$$\cos \alpha \cos \beta = \frac{1}{2} \{\cos (\alpha + \beta) + \cos (\alpha - \beta)\}$$

Substituting in Equation 2 and differentiating:

$$U = \frac{C}{2}\hat{\phi}\omega\{(n+1) \sin \{(n+1)\omega t + \xi\} + (n-1) \sin \{(n-1)\omega t + \xi\}\} \qquad (3)$$

At output, according to Equation 3, there occur two potentials of frequencies $\omega(n+1)$ and $\omega(n-1)$, which are mutually superimposed. For practical use, of course, only one output frequency is wanted. To supress one of the two output frequencies, two generators are combined. The winding of the second generator is rotated clockwise by an amount $\pi/2$ relative to the winding of the first generator, and the system is mounted on a common shaft. Besides, the field $\phi_2$ acquires a phase advance in time of $\pi/2$. In FIG. 2, for greater clarity, such a system is represented in one plane. The output leads of the two part windings are connected in series. The second generator is governed by the equations:

$$\phi = \hat{\phi}\left(\cos \left(n\omega t + \frac{\pi}{2} + \xi\right)\right) = -\hat{\phi} (\sin (n\omega t + \xi))$$

$$U = Cd\hat{\phi} (\sin (n\omega t + \xi))(\sin \omega t)/dt \qquad (4)$$

Making use of the same substitutions as before, and of the relation $$\sin \left(\frac{\gamma + \rho}{2}\right) \sin \left(\frac{\gamma - \rho}{2}\right) = \frac{1}{2} (\cos \gamma - \cos \rho)$$

we obtain:

$$-\sin \alpha \sin \beta = \frac{1}{2} \{\cos (\alpha + \beta) - \cos (\alpha - \beta)\}$$

Substituting in Equation 4 and differentiating:

$$U = \frac{C}{2}\hat{\phi}\omega\{-(n+1) \sin \{(n+1)\omega t + \xi\} + (n-1) \sin \{(n-1)\omega t + \xi\}\} \qquad (5)$$

Addition of the output potentials of generators 1 and 2 gives the sum of Equations 3 and 5:

$$U = -C\hat{\phi}\omega(n-1) \sin ((n-1)\omega t + \xi) \qquad (6)$$

This yields a subtraction of the two components of potential due to rotational and field frequency. It will be seen that, as desired, only one output frequency results.

If the connections of the two windings are interchanged, the generated potential becomes:

$$U = -C\hat{\phi}\omega(n+1) \sin((n+1)\omega t + \xi) \quad (7)$$

The result is an "additive circuit," in which again only one output frequency $\omega(n+1)$ is obtained. Which of the two cases, "subtraction" or "addition" of output potentials, is to be applied, must be considered in each instance. Either arrangement is theoretically possible according to the invention. In the course of further description, the "subtractive" circuiting of component potentials will be explored in more detail. It will be convenient to rewrite Equation 6 thus:

$$U = C\hat{\phi}\omega(1-n) \sin((n-1)\omega t + \xi) \quad (6a)$$

Here the output frequency is $\omega(1-n) = \omega - n\omega$. Thus it turns out that the output frequency, which to solve the problem of the invention must remain constant, is composed of the rotational frequency $\omega$ of the rotor winding and the excitation frequency $n\omega$ of the field windings. Henceforth the output frequency will be called $\omega_{const}$, the rotational frequency $\omega_{rot}$, and the excitation frequency, on account of its transformer-like effect, $\omega_{trans}$.

Hence the relations $\omega_{const} = \omega_{rot} - \omega_{trans}$ and $$n = \frac{\omega_{trans}}{\omega_{rot}}$$

For practical applications, the case $n < 1$ would seem of interest.

The invention having been thus far explained and demonstrated theoretically, the arrangement of the windings will now be chosen such, in accordance with a possible embodiment, that the field windings of the two generators are on the rotor, and the rotor windings are transferred to the stators of the generators. This in no way changes the function of the system, since the relative motions of the two windings—field windings and rotor windings—remain the same in the two generators. Next, the two generators may preferably be combined into a unit in a common housing. The resulting generator structure will henceforth be referred to as the principal generator, to distinguish it from others, such as auxiliary generators. The field windings of this principal generator, in accordance with the relations derived above, must be energized at the frequency $\omega_{trans}$. The resulting field is intersected by the rotor windings at frequency $\omega_{rot}$. The induced potential of frequency $\omega_{const}$ must be tapped off in suitable manner.

FIG. 3 schematically illustrates such an arrangement. A principal generator H is connected to a source of power T so that its rotor is driven at a variable speed $\omega_{rot}$. The field windings of the principal generator are energized at a frequency $\omega_{trans}$ by an excitation means E. The excitation machine is driven at the rate of $\omega_{const}$ by an auxiliary source of power HA. The frequency difference $\omega_{const}$ is taken off the principal generator H and passed over a potential regulator R acting on the excitation means E, to the working circuit, for example, aboard an aircraft.

FIGS. 4 and 5 show simplified representations of two conceivable embodiments of the generator system. The principal generators H are driven by power transmissions, not shown, by way of gears 1, and an angular velocity $\omega_{rot}$. In FIG. 4, this rotates a rotor 2 fitted with field windings 2a and 2b which, according to the invention, produce magnetic fields which are ninety degrees out of phase. The frequency $\omega_{trans}$ at which the field windings 2a and 2b are energized is produced in the excitation means E, rotating integrally with the principal generator H. The excitation rotor 3, which for ease of potential adjustment, for example by a variation of air gap, is tapered, bears the windings, and the "stator" 4 contains the poles with the permanent magnets. The "stator" 4 is driven, in the same direction of rotation as rotor 3, by an auxiliary drive HA, at the required output frequency $\omega_{const}$. Then the excitation frequency for field windings 2a and 2b is always $\omega_{trans} = \omega_{rot} - \omega_{const}$.

The auxiliary drive HA may for example consist of a hydraulic motor 5 running at constant speed $\omega_{const}$ and driving the "stator" 4 by way of a gear 6. In the rotor windings 7a and 7b on the stator of the principal generator H, respectively associated with the corresponding field windings 2a and 2b, the resultant frequency $\omega_{const}$ at which the "stator" of the excitation machine E is being driven.

A disadvantage of the arrangement described is the comparatively high mechanical cost of the auxiliary drive HA, when several generator systems of like phase are to be connected in parallel. In that case, the "stator" 4 may for example have to be driven by way of a differential gear to obtain phase equality. Besides, an electrical system will be required to keep all auxiliary drives HA synchronized.

The example of FIG. 5 represents a simplified arrangement of auxiliary drive HA and excitation means E. In the excitation means, the rotating system of permanent magnets 4 in FIG. 4 has been replaced by an electromagnetic system with stator 8, which, being fed by an auxiliary generator 9, sets up a rotating magnetic field of frequency $\omega_{const}$ without itself having to rotate. The auxiliary generator 9 is mechanically driven by a hydraulic motor 10 at a constant speed corresponding to the frequency. The rotor 11 of excitation means E is rigidly united with the principal generator H, and turns at the angular velocity $\omega_{rot}$. In the excitation means E, mixture of the two frequencies $\omega_{const}$ and $\omega_{rot}$ generates the frequencies $\omega_{trans}$ supplied to the field coils 12a and 12b on the rotor of the principal generator H. To bring about the phase displacement of $\pi/2$ in time at which—to produce the constant-frequency output potential—the potentials must occur in the field windings 12a and 12b, the excitation rotor of E is provided with two coils 11a and 11b set ninety degrees apart in space. The pairs of windings 13a and 13b on the stator of the principal generator H, to achieve the effect according to the invention, are likewise rotated at ninety degrees to each other, and offset spatially besides; in the arrangement shown, these windings 13a and 13b appear much compressed for clearer representation of their relative displacement by ninety degrees. In the principal generator H, consequently, the cooperation of field and rotor windings eliminates one frequency, leaving only the desired frequency $\omega_{const}$ to be transmitted to the point of consumption. To equalize the phases of several generator systems that are to operate on the same network, the stator 8 of the excitation means E with its electromagnet system is merely turned through a certain angle. For this purpose, the excitation means E is provided with a lever 14, to be acted upon for example by a servomotor.

FIG. 6 shows a block diagram of two generator systems hooked up together. The chief components have already been explained in the course of describing the earlier figures. The sources of power $T_A$ and $T_B$ are associated with centrifugal governors $F_A$ and $F_B$ which, when a predetermined minimum speed of $\omega_{rot}$ has been reached, close a circuit by way of a relay S. By means of a contact $s$, relay S then connects the service circuits of the two principal generators $H_A$ and $H_B$. The two excitation machines $E_A$ and $E_B$ are supplied by a common auxiliary generator HG with the constant magnetic field frequency $\omega_{const}$, and checked for phase equality by a phase meter P. The phase meter P acts by means of servomotors $V_A$ and $V_B$ on the levers of the excitation machines $E_A$ and $E_B$.

What we claim is:
1. In an electrical generating system, in combination: an alternating-current generator having an output of substantially constant frequency, said generator comprising a stator member and a rotor member rotatable relatively to said stator member, one of said members being provided with a pair of field windings axially spaced from each other, the other of said members being provided with a pair of output windings axially spaced from each other and aligned with respective field windings, the windings of one of said pairs being angularly offset from each other by substantially 90° while being connected in series;

drive means for operating said rotor with a predetermined rotational frequency $\omega_{rot}$;

alternating-current means for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator; and circuit means connected to said output windings for operating a load.

2. In an electrical generating system, in combination:

an alternating-current generator having an output of substantially constant frequency, said generator comprising a stator member and a rotor member rotatable relatively to said stator member, said rotor being provided with a pair of field windings axially spaced from each other, said stator members being provided with a pair of output windings axially spaced from each other and aligned with respective field windings, the windings of one of said pairs being angularly offset from each other by substantially 90° while being connected in series;

drive means for operating said rotor with a predetermined rotational frequency $\omega_{rot}$;

alternating-current means for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator; and circuit means connected to said output windings for operating a load.

3. In an electrical generating system, in combination:

an alternating-current generator having an output of substantially constant frequency, said generator comprising a stator member and a rotor member rotatable relatively to said stator member, said rotor member being provided with a pair of field windings axially spaced from each other, said stator members being provided with a pair of output windings axially spaced from each other and aligned with respective field windings, said output windings being angularly offset from each other by substantially 90° while being connected in series;

drive means for operating said rotor with a predetermined rotational frequency $\omega_{rot}$;

alternating current means for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator; and circuit means connected to said output windings for operating a load.

4. In an electrical generating system, in combination:

an alternating-current generator having an output of substantially constant frequency, said generator comprising a stator member and a rotor member rotatable relatively to said stator member, one of said members being provided with a pair of field windings axially spaced from each other, the other of said members being provided with a pair of output windings axially spaced from each other and aligned with respective field windings, the windings of one of said pairs being angularly offset from each other by substantially 90° while being connected in series;

a drive means for operating said rotor with a predetermined rotational frequency $\omega_{rot}$;

alternating-current means coupled with said rotor for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator; and circuit means connected to said output windings for operating a load.

5. In an electrical generating system, in combination:

an alternating-current generator having an output of substantially constant frequency, said generator comprising a stator member and a rotor member rotatable relatively to said stator member, one of said members being provided with a pair of field windings axially spaced from each other, the other of said members being provided with a pair of output windings axially spaced from each other and aligned with respective field windings, the windings of one of said pairs being angularly offset from each other by substantially 90° while being connected in series;

drive means for operating said rotor with a predetermined rotational frequency $\omega_{rot}$;

alternating-current means for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator, the ratio $$\frac{\omega_{in}}{\omega_{out}}$$

of said excitation frequency to said rotational frequency being less than unity; and circuit means connected to said output windings for operating a load.

6. In an electrical generating system, in combination:

an alternating-current generator having an output of substantially constant frequency, said generator comprising a stator member and a rotor member rotatable relatively to said stator member, one of said members being provided with a pair of field windings axially spaced from each other, the other of said members being provided with a pair of output windings axially spaced from each other and aligned with respective field windings, the windings of one of said pairs being angularly offset from each other by substantially 90° while being connected in series;

drive means for operating said rotor with a predetermind rotational frequency $\omega_{rot}$;

alternating-current means for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator, said alternating-current means including an excitation coil operatively coupled with said rotor for rotation synchronously therewith, said coil being connected in circuit with said field windings, and magnetic means juxtaposed with said coil for producing a magnetic field intercepted thereby; and output means connected to said output windings for operating a load.

7. In an electrical generating system, in combination:

an alternating-current generator having an output of substantially constant frequency, said generator comprising a stator member and a rotor member rotatable relatively to said stator member, one of said members being provided with a pair of field windings axially spaced from each other, the other of said members being provided with a pair of output windings axially spaced from each other and aligned with respective field windings, the windings of one of said pairs being angularly offset from each other by substantially 90° while being connected in series;

drive means for operating said rotor with a predetermined rotational frequency $\omega_{rot}$;

alternating-current means for energizing said field windings with an excitation current having a frequency $\omega_{in}$ equal substantially to the difference $\omega_{rot}-\omega_{out}$ between said rotational frequency $\omega_{rot}$ and the constant-frequency output $\omega_{out}$ of said generator, said alternating-current means including an excitation coil operatively coupled with said rotor for rotation synchronously therewith, said coil being connected in circuit with said field windings, magnetic means juxtaposed with said coil for producing a magnetic field intercepted thereby, and means controlled by said output frequency for rotating said magnetic means in step therewith in a sense identical to the sense of rotation of said coil; and output means connected to said output windings for operating a load.

References Cited in the file of this patent

UNITED STATES PATENTS

| | | |
|---|---|---|
| 2,759,116 | Glass | Aug. 14, 1956 |
| 2,831,156 | Mathews et al. | Apr. 15, 1958 |
| 2,889,475 | Emerson | June 2, 1959 |